United States Patent [19]

Price et al.

[11] Patent Number: 4,888,123

[45] Date of Patent: Dec. 19, 1989

[54] DETERGENT COMPOSITIONS CONTAINING CALCIUM PYROPHOSPHATE AS AN ANTIDEPOSITION AGENT

[75] Inventors: Timothy J. Price, Cheshire; Royston R. Smith, Wirral, both of United Kingdom

[73] Assignee: Lever Brothers Company, New York, N.Y.

[21] Appl. No.: 217,804

[22] Filed: Jul. 12, 1988

[30] Foreign Application Priority Data

Jul. 17, 1987 [GB] United Kingdom ................. 8716899

[51] Int. Cl.[4] ........................... C02F 5/08; C02F 5/14; C11D 3/06; C11D 3/10

[52] U.S. Cl. .................................... 252/135; 252/133; 252/174.14; 252/174.16; 252/181; 252/DIG. 15; 252/DIG. 17; 423/306; 423/307

[58] Field of Search ................... 252/133, 135, 174.16, 252/174.14, 540, 181, DIG. 15, DIG. 17; 423/306, 307, 316, 314–315; 71/33, 36

[56] References Cited

U.S. PATENT DOCUMENTS

| | | | |
|---|---|---|---|
| 2,631,102 | 3/1953 | Hubbard et al. | 99/95 |
| 3,028,217 | 4/1962 | Brown | 23/107 |
| 3,875,289 | 4/1975 | Kim | 423/306 |
| 3,939,100 | 2/1976 | Hau et al. | 252/532 |
| 3,957,695 | 5/1976 | Davies et al. | 252/532 |
| 3,985,675 | 10/1976 | Kim | 252/317 |
| 4,007,124 | 2/1977 | Collier et al. | 252/109 |
| 4,019,998 | 4/1977 | Benson et al. | 252/135 |
| 4,362,642 | 12/1982 | Carter et al. | 252/174.16 |

FOREIGN PATENT DOCUMENTS 0068721 1/1983 European Pat. Off. .

OTHER PUBLICATIONS

Chemical Abstracts, vol. 78, 1973, p. 277, abstract #134915w, Savent et al., "Reaction Products of Applied Pyrophosphates in Some Manitoba Soils".

Savent et al., vol. 95, 1981, p. 549, abstract #5660m.

Yadav et al., "Formation of Reaction Products from Potassium Pyrophosphophate Fertilizer in Soils W/Special Reference to the Effects of Zinc & Manganese Application".

Yadav et al, vol. 105, 1986, p. 451, abstract #4626t, Nagasawa et al., "Hydrolysis & Precipitate Formation of Diphosphate Ion in the Presence of Calcium Ion".

Research Disclosure 17167, Jul. 1978.

*Primary Examiner*—Paul Lieberman
*Assistant Examiner*—Ardith Beadles-Hay
*Attorney, Agent, or Firm*—Matthew J. McDonald

[57] ABSTRACT

A detergent composition contains a detergent active material, a carbonate builder, such as sodium carbonate, and a calcium containing compound ideally selected from specific calcium pyrophosphates, as an antideposition agent. The latter is characterized by a defined calcium influence test. Preferred calcium pyrophosphate compounds may be made by mixing solutions of calcium chloride and sodium dihydrogen pyrophosphate at a pH of less than 3.6 and removing the precipitate which forms.

3 Claims, No Drawings

DETERGENT COMPOSITIONS CONTAINING CALCIUM PYROPHOSPHATE AS AN ANTIDEPOSITION AGENT

FIELD OF THE INVENTION

This invention relates to detergent compositions, particularly but not exclusively to detergent compositions for washing fabrics.

BACKGROUND ART

Detergent compositions for washing fabrics conventionally contain a detergent active material and a builder material, the latter being added in order, inter alia, to reduce the level of free calcium ions in the wash liquor. While phosphate salts, particularly sodium tripolyphosphate, are often used as builder materials there is an increasing desire to use alternative materials in order to avoid any environmental problems which might arise due to the discharge of phosphate containing waste liquors into rivers and lakes. While a number of alternative builder materials have been suggested, water-soluble carbonates such as sodium carbonate are particularly attractive from the point of view of cost. However, the use of sodium carbonate as a builder material has certain disadvantages, amongst which are the tendency of the precipitated calcium carbonate to become deposited on the fabrics and on surfaces of the washing machine and the sensitivity of the calcium ion/carbonate reaction to poisoning by materials which may well be present, even unintentionally, in the wash liquors resulting in a final free calcium ion concentration which is not as low as is desirable to achieve good detergency.

We have now surprisingly found a class of materials which, if included in detergent compositions containing water-soluble carbonates as builders, are capable of significantly reducing the level of deposition on fabrics and/or washing machine surfaces.

Thus, according to the invention there is provided a detergent composition for washing fabrics which contains:

(i) a detergent active material;

(ii) a water-soluble carbonate material, preferably an alkali metal carbonate, bicarbonate or mixture thereof; and (iii) an antideposition agent which comprises a calcium containing compound which in a free calcium ion influence test (as herein defined) yields a value of A below 0.5° FH and a value of B above 0.5° FH.

An essential component of the composition according to the invention is a detergent active material. This material may be selected from anionic, nonionic, amphoteric and zwitterionic detergent active compounds and mixtures thereof, particularly such compounds which do not form during use at normal product concentration in hard water excessively water-insoluble calcium salts; this ensures that the detergent active compound is not completely precipitated as its calcium salt instead of calcium carbonate being precipitated. Some degree of precipitation of the detergent active compound or mixture of compounds in the form of the calcium salts may be tolerated, provided that after allowing for the subsequent redissolution of any of the calcium salt during the washing process, the amount of any more permanent precipitate is minor and an effective amount of detergent active compound is left in solution.

Many suitable synthetic detergent active compounds are commercially available and they are fully described in the literature, for example in "Surface Active Agents and Detergents" Volumes 1 and 2, by Schwartz, Perry and Berch.

The preferred detergent active compounds are fully described in GB 1 437 950 (UNILEVER).

The effective amount of the detergent active compound or compounds used in the compositions of the present invention is generally in the range from 5 to 40% by weight, preferably not more than 30% by weight of the composition.

The water-soluble carbonate material used is preferably sodium or potassium carbonate or a mixture thereof, for reasons of cost and efficiency. The carbonate salt is preferably fully neutralised but it may be partially neutralised, for example a sesquicarbonate may be used in partial replacement of the normal carbonate salt; the partial salts tend to be less alkaline and therefore less efficient. The amount of water-soluble carbonate material in the detergent composition can be varied widely, but the amount should be at least 5% by weight, such as from 10% to 40%, preferably 10% to 30% by weight, though an amount of up to 75% could possibly be used if desired in special products The amount of the water-soluble carbonate material is determined on an anhydrous basis, though the salts may be hydrated either before or when incorporated into the detergent composition. It should be mentioned that within the preferred range the higher levels tend to be required under conditions of use at low product concentrations, as is commonly the practice in North America, and the converse applies under conditions of use at higher product concentrations, as tends to occur in Europe. It should be noted that it may also be desirable to limit the carbonate content to a lower level within the range mentioned, so as to decrease the risk of internal damage following any accidental ingestion, for example by children.

The antideposition agent is a calcium containing compound which is characterised by the following free calcium ion influence test.

FREE CALCIUM ION INFLUENCE TEST

A sample of hard water is prepared by dissolving sufficient calcium chloride in 0.018 molar sodium chloride solution at 25° C. to yield a hardness of 24.5° FH (i.e. $24.5\times10^{31\ 4}$ molar free calcium ions). This solution is continuously stirred with a magnetic stirrer throughout the test. 2.5 mg of the antideposition agent under test and 15 mg Calofort U (Trade Mark for calcite ex J E Sturge & Company Ltd., having a surface area of 17–23 $m^2/g$) are added to 20 ml of this water. After 1 minute, 3.8 ml sodium carbonate solution (0.1 molar) is added. After a further minute, the free calcium ion concentration is measured using a calcium ion electrode. This value is referred to as "A". After a further 20 minutes, 0.17 ml calcium chloride solution (0.1 molar) is added. After a further minute the free calcium ion concentration is measured again ("B").

We have found that the values of A and B yielded by this test depend on the nature of the antideposition agent tested and further that only those antideposition agents which yield values of A and B within specific ranges prove to be suitable antideposition agents in the present invention.

Specifically we have found that the value of A should be less than 0.5° FH., preferably not more than 0.2° FH. A number of materials have been found to satisfy this condition. However, we have found that only materials which also satisfy the condition that the value of B should be more than 0.5° FH., preferably not less than 0.7° FH. prove to be suitable antideposition agents in the present invention.

We have discovered a number of calcium salts of phosphorus-containing acids which will satisfy these criteria. Examples are some of the salts of pyrophosphoric acid or hydroxy-ethane 1,1 diphosphonic acid. These salts may contain other cations in addition to calcium, in particular monovalent cations such as hydrogen and alkali metals and mixtures thereof and the level of such other cations determines the value of A and B. Thus, for example, it is possible to prepare a range of compounds having the general formula $$Ca_xM_mP_2O_7.nH_2O$$

where M is selected from potassium, sodium, hydrogen and ammonium ions or any mixture thereof, and 2x plus m is approximately equal to 4, which exhibit different values of A and B according to the values of x, m and n. As will be shown below, preferred values of x have been found to be from about 1.25 to about 1.75, preferred values of m are from about 0.5 to about 1.5 and n is preferably greater than zero, most preferably about 2 to about 5.

Calcium pyrophosphate salts can be prepared under a variety of conditions. Specifically they may be prepared by mixing solutions of a soluble calcium salt such as calcium chloride and a soluble pyrophosphate salt such as sodium pyrophosphate or sodium dihydrogen pyrophosphate.

The mixing reaction is preferably carried out at room temperature. After mixing, the reaction mixture is allowed to stand overnight and then the precipitated material is filtered off. The stoichiometry of the precipitated product may be predetermined by the relative concentrations of the two solutions and by adjusting the pH of the calcium chloride solution by the addition of appropriate amounts of acid, such as hydrochloric acid.

Preferred antideposition agents according to the invention are prepared by mixing a calcium chloride solution having a concentration of more than 0.5 molar at a pH of less than 3.6 with a sodium dihydrogen pyrophosphate solution having a concentration between 0.25 and 0.33 molar, the relative molar concentration of the calcium chloride and sodium dihydrogen pyrophosphate solutions being more than 1:1. This method leads to a product which may contain some sodium chloride It is not necessary for this sodium chloride to be removed before the product is used.

The materials prepared in this way can be analysed by the use of atomic absorption for $Ca^{2+}$ and $Na^+$, colorimetric analysis (molybdenum blue) for phosphate, thermogravimetric analysis for water of crystallisation and X-ray diffraction to confirm reproducibility The basic molybdenum blue method for phosphate determinations (D N Fogg and N T Wilkinson, The Analyst 83 403 [1958]) has to be modified to work in the presence of calcium at concentrations up to 10° FH.

Specifically, the method is carried out as follows:

(a) Take 5 $cm^3$ of the pyrophosphate solution, add 15 $cm^3$ sulphuric acid (2.5M) and boil for 40 mins. Cool and make up to 25 $cm^3$ with distilled water.

(b) Take 10 $cm^3$ of this hydrolysed phosphate solution and add 5 $cm^3$ distilled water, 3 $cm^3$ sodium molybdate solution (25 g $Na_2MoO_4.2H_2O$ in 1 $dm^3$ 1M sulphuric acid) and 0.5 $cm^3$ cm sulphate solution (1.5 g $NH_2NH_2H_2$ in 1 $dm^3$ distilled water). Boil for 15 mins and make up to 25 $cm^3$.

(c) Measure the absorbance of this solution at 826 nm and compare with standards.

The level of antideposition agent in the compositions of the invention is preferably from 0.1% to 10% by weight, such as from 0.2% to 5% by weight.

It is preferred that the compositions according to the invention contain a water-insoluble carbonate material, as described in GB 1 437 950 (UNILEVER), especially a high surface area insoluble carbonate material such as calcite to act both as a seed crystal for the precipitating calcium carbonate and as an adsorbent for any crystal growth poisons which may be present. The use of a seed crystal ensures that the precipitated calcium carbonate grows to a crystal size which is sufficient that it will not be deposited on the fabrics.

The water-insoluble carbonate material is preferably calcium carbonate. If used, the insoluble carbonate material should have a surface area of at least 5 $m^2/g$, and preferably at least 15 $m^2/g$. The particularly preferred material has surface area from 30–100 $m^2/g$. Insoluble carbonate material with surface areas in excess of 100 $m^2/g$ may be used, up to say 200 $m^2/g$, if such materials are economically available.

The lower surface area materials are satisfactory when added to act as a seed crystal to reduce deposition on fabrics. The higher surface area material is particularly desirable when added to act as an adsorber for crystal growth poisons and as a seed crystal to achieve both adequate control of free calcium and deposition on fabrics.

Any crystalline form of calcium carbonate may be used or a mixture thereof, but calcite is preferred as aragonite and vaterite are less readily available commercially, and it appears that calcite is a little less soluble than aragonite or vaterite at most usual wash temperatures. When any aragonite or vaterite is used, it is generally in admixture with calcite.

The selected level of insoluble carbonate material depends on the specific surface area and on the purpose for which it is added, as described above.

The amount of insoluble carbonate material used in the compositions should be from 5% to 60%, more preferably from 5% to 30%.

In addition to the water-insoluble carbonate material and the water-soluble carbonate material it is possible to include minor amounts of other detergency builders, provided that the total amount of the detergency builders does not exceed 85% by weight, so as to leave room in the detergent composition for other essential ingredients. One such detergency building ingredient is an alkali metal silicate, particularly sodium neutral, alkaline, meta- or orthosilicate. A low level of silicate, for example 5–10% by weight, is usually advantageous in decreasing the corrosion of metal parts in fabric washing machines, and it may give processing benefits. If higher levels of silicate are used up to a practical maximum of 30%, for example from 10% to 20% by weight, there can be a more noticeable improvement in detergency, which may permit some decrease in the water-soluble carbonate material content. This effect appears to be particularly beneficial when the compositions are used in water with appreciable levels of magnesium hardness. The amount of silicate can also be used to some extent to control the pH of the composition, which is generally within the range of 9–11, preferably 10–11 for an aqueous solution of the composition at the recommended concentration. It should be noted that a higher pH (i.e. over pH 10.5) tends to be more efficient as regards detergency, but it may be less desirable for domestic safety. Sodium silicate is commonly supplied in concentrated aqueous solution, but the amounts are calculated on an anhydrous basis.

Other detergency builders can be present, for example, other so-called precipitant builders which form insoluble calcium salts, such as the alkali metal soaps or salts of long-chain alpha-sulphonated monocarboxylic acids and alkali metal salts of alkyl and alkenyl succinic and malonic acids, and analogous compounds, some of which can have a desirable fabric softening effect, some sequestrant builders, such as sodium citrate, sodium tripolyphosphate, sodium pyrophosphate, nitrilo triacetic acid and its salts and polyacetalcarboxylates (see U.S. Pat. No. 4,144,125 and 4,146,495) or ion exchange materials such as crystalline or amorphous aluminosilicates. It should be noted, however, that some detergency builders, especially certain sequestrants such as polyphosphates and certain polymeric poly-carboxylate builders, can have a marked detrimental effect on calcium carbonate precipitation.

Where a soap is used as an additional builder it may be present in such a quantity that it will also contribute as a detergent active material.

Apart from the detergent active compounds and detergency builders, a detergent composition of the invention can contain any of the conventional additives in the amounts in which such additives are normally employed in fabric washing detergent compositions. Examples of these additives include the lather boosters such as alkanolamides, particularly the monoethanolamides derived from palm kernel fatty acids and coconut fatty acids, lather depressants, oxygen-releasing bleaching agents such as sodium perborate and sodium percarbonate, peracid bleach precursors, chlorine-releasing bleaching agents such as trichloroisocyanuric acid, fabric softening agents, inorganic salts such as sodium sulphate, and, usually present in very minor amounts, fluorescent agents, perfumes, enzymes such as proteases and amylases, germicides and colourants.

The detergent compositions of the invention may take any of the common physical forms associated with fabric washing detergent compositions. They may also be produced by any of the techniques commonly employed in the manufacture of fabric washing detergent compositions, including particularly slurry-making and spray-drying processes for the manufacture of detergent powders. The insoluble carbonate material may be incorporated in the slurry or post-dosed to a spray-dried base powder.

The antideposition agent is preferably not part of the spray-dried powder, but may be dry-mixed with a spray-dried base power.

The invention will now be illustrated by the following non-limiting Examples.

EXAMPLES 1 TO 10

A number of calcium pyrophosphate materials were prepared by mixing solutions of calcium chloride (with pH adjusted by means of hydrochloric acid) and sodium di-hydrogen pyrophosphate having the concentrations as set out in the following Table I, allowing the mixture to stand overnight, filtering off the precipitated material and analysing its content.

TABLE I

| Example | Concentrations (molar) | | | Analysis | | | |
|---|---|---|---|---|---|---|---|
| No | $CaCl_2$ | (pH) | $Na_2H_2P_2O_7$ | x | m | n | y |
| 1 | 0.6 | (2.5) | 0.3 | 1.32 | 1.36 | 2.6 | 2.5 |
| 2 | 0.3 | (3.6) | 0.3 | 1.28 | 1.44 | 2.3 | 3.0 |
| 3 | 0.33 | (6.0) | 0.33 | 1.33 | 1.34 | 2.3 | 6.7 |
| 4 | 0.5 | (6.0) | 0.25 | 1.39 | 1.22 | 2.7 | 11.6 |
| 8 | $1 \times 10^{-3}$ | (5.5) | 0.1 | 1.00 | 2.00 | 4.0 | 0 |
| 9 | 0.6 | (2.5) | 0.3 | 1.29 | 1.42 | 2.1 | 4.6 |
| 10 | 0.6 | (2.5) | 0.3 | 1.30 | 1.40 | 1.9 | 4.9 |

In the Table the analysis of the product is expressed in terms of the formula $$Ca_xH_mP_2O_7.nH_2O$$

y is the percentage of sodium chloride found to be present in the product.

Examples 9 and 10 are a repeat of Example 1 and show the reproducibility of the method. Example 8 follows the directions given in P T Cheng, K Pritzker, M E Adams, S C Nyburg and S A Omar, J Rheumatol 7 (%) 609 (1980) and as will be observed leads to a fully neutralised pyrophosphate salt.

Using the free calcium ion influence test, these materials and a number of others were assessed for their applicability to the present invention. The results were as set out in the following Table II.

TABLE II

| Example No | FREE CALCIUM ION INFLUENCE TEST (°FH) A | B |
|---|---|---|
| Control (no material tested) | 0.04 | 0.05 |
| 1 | 0.2 | 1.3 |
| 2 | 0.5 | 1.6 |
| 3 | 0.6 | 1.6 |
| 4 | 0.7 | 1.8 |
| 8 | Not evaluated - too soluble | |
| 9 | 0.1 | 1.2 |
| 10 | 0.1 | 0.8 |
| $Na_2H_2P_2O_7$ | 1.2 | 1.5 |
| $CaH_2P_2O_7$ | 0.9 | 1.1 |
| $Ca_2P_2O_7$ | 0.1 | <0.1 |

The disodium dihydrogen pyrophosphate was ex BDH. The two calcium pyrophosphates were ex Budenheim.

The data in this Table illustrates that only Examples 1, 9, 10 and $Ca_2P_2O_7$ satisfy the condition that A be less than 0.5° FH., but that $Ca_2P_2O_7$ does not satisfy the condition that B should be more than 0.5° FH. Thus, it is only Examples 1, 9 and 10 which satisfy all the conditions of the present invention.

A detergent composition was prepared having the following composition:

| Ingredients | % (by weight) |
|---|---|
| Spray-dried base powder: | |
| Nonionic detergent active[1] | 10.0 |
| Sodium carbonate | 35.0 |
| Sodium alkaline silicate | 8.0 |
| Minor ingredients and water | 6.0 |
| Dry mixed with the base powder: | |
| Calcite[2] | 10.0 |
| Sodium perborate tetrahydrate | 20.0 |

-continued

| Ingredients | % (by weight) |
|---|---|
| Sodium sulphate | 10.0 |
| Anti-deposition agent (Example 1) | 1.0 |
| | 100.0 |

Notes:
[1]Synperonic A7 (ex ICI) which is approximately an ethoxylated alcohol having an alkyl chain length of 13-15 carbon atoms and an average of 7 ethylene oxide groups per molecule.
[2]Calofort U (ex Sturge) having a specific surface area of 17-23 $m^2/g$.

This formulation was used to wash a fabric load in a MIELE 429 (Trade Mark) automatic washing machine at 60° C., using the main wash only program. The water used had a calcium hardness of 24° FH. The wash liquor volume was 16 liters. 80 g of product were used.

The fabric consisted of 2.3 Kg of clean cotton fabrics together with cotton vesting, cotton sheeting, polyester and nylon monitors. The wash program was repeated 20 times, after which time the level of deposition on the monitors was assessed by a conventional washing technique. The experiment was repeated with the only difference that the antideposition agent was omitted. The results are set out in the following Table III.

TABLE III

| Antideposition agent | % ash (20 washes) Cotton vesting | Cotton sheeting | Polyester | Nylon |
|---|---|---|---|---|
| Present | 2.77 | 1.56 | 0.08 | 0.26 |
| Absent | 4.00 | 1.98 | 1.52 | 0.60 |

It will be observed that with all fabric materials tested the antideposition agent reduced the % ash after 20 washes, particularly on the synthetic fabric materials.

EXAMPLE 11

A detergent composition was prepared containing:

| Ingredients | % by weight |
|---|---|
| Anionic detergent active[3] | 11.0 |
| Nonionic detergent active[1] | 4.0 |
| Sodium carbonate | 30.0 |
| Sodium alkaline silicate | 8.0 |
| Calcite (SOCAL U3)[4] | 20.0 |
| Sodium perborate | 13.0 |
| Sucrose | 4.0 |
| Water and miscellaneous | balance |

Notes:
[3]Dobane 113 (ex Shell Chemicals) which is sulphonated to form approximately a sodium alkyl benzene sulphonate in which the alkyl group contains from 10 to 15 carbon atoms
[4]ex Solvay, having a nominal surface area of 100 $m^2/g$.

This formulation was used to wash a 2 Kg fabrics load in 24° FH water (18.2 liters) using a BRANDT STATOMATIC 432 automatic washing machine using the 60° C. colour wash programme. 120 g of product were used. The fabric load consisted of a clean cotton ballast load plus clean desized monitors as identified below. After repeated washing and drying for 10 cycles the level of deposition on the monitors was assessed using a conventional ashing technique. In one series of experiments 2.4 g of the calcium pyrophosphate salt of the formula $Ca_{1.46}H_{1.08}P_2O_7.2.OH_2O$ (A=0.24° FH., B=1.4° FH.) was added, while in another series no antideposition agent was added. The results were as follows:

| Fabric Type | % ash after 10 washes with antideposition agent | without |
|---|---|---|
| Terry-towelling | 1.0 | 1.8 |
| Cotton vesting | 0.8 | 1.9 |
| Cotton sheeting | 0.6 | 1.4 |

These results demonstrate that the antideposition agent of tested significantly reduces the level of deposition on fabrics.

In these experiments the condition of the stainless steel drum of the washing machine was examined after each wash cycle. In the absence of the antideposition agent a visible dulling of the drum was observed after only two wash cycles. In the presence of the agent no such effect was observed, even after a total of 20 cycles.

EXAMPLE 12

This Example was designed to observe the effect of the calcium pyrophospate material of Example 10 in a soiled load system (note that Examples 1 to 11 use clean fabric loads). The conditions of Example 11 were repeated except that the fabric load consisted of soiled cotton fabrics ballast with clean monitors and that the wash/dry cycle was repeated 20 times (the soiled load was replaced by a fresh soiled load after each cycle whereas the monitors remained throughout). Also the reflectance from the initially clean monitors was assessed and compared to the untreated fabric to indicate the degree of soil transfer from the ballast. The results were as follows:

| Fabric type | % ash after 20 washes (reflectance Δ $R_{460}$*) with antideposition agent | | without | |
|---|---|---|---|---|
| Terry-towelling | 0.53 | (−1.6) | 0.91 | (−2.5) |
| Cotton vesting | 0.59 | (−1.5) | 1.11 | (−2.3) |
| Cotton sheeting | 0.45 | (+1.3) | 0.71 | (+1.0) |

Again it is apparent from these results that the antideposition agent of Example 10 significantly reduces the level of deposition on fabrics, even in the presence of a soiled load. The reflectance figures show that, in the absence of the calcium pyrophosphate some soil was deposited on the terry towelling and cotton vesting. When the calcium pyrophosphate was present, reflectance levels were in all cases higher representing a reduction in the soil deposition on the monitors.

EXAMPLE 13

A detergent composition was prepared containing:

| Ingredients | % by weight |
|---|---|
| Anionic detergent active[5] | 6.2 |
| Nonionic detergent active[6] | 2.8 |
| Soap | 2.8 |
| Sodium carbonate | 35.0 |
| Calcite (CALOFORT U) | 15.0 |
| Sucrose | 4.0 |
| Sodium perborate (monohydrate) | 11.0 |
| Sodium silicate | 6.2 |
| Water and miscellaneous | balance |

Notes
[5]as Example 11.
[6]Dobanol 45-11EO which is approximately an ethoxylated alcohol having an alkyl chain length of 14-15 carbon atoms and an average of 11 ethylene oxide groups per molecule.

This formulation was used to wash fabrics as described in Example 11 using a dosage of 150 g powder in a Hoover (Trade Mark) front loading automatic washing machine. Three series of washes were carried out, one (Example 13A) with the equivalent of 2% of a calcium pyrophosphate having the general formula $Ca_{1.62}H_{0.76}P_2O_7$:$4.9H_2O$(A=0.24° FH., B=0.9° FH), one (Example 13B) with the equivalent of 2% of dicalcium pyrophosphate (ex Buddenheim) and one (Example 13C) with no antideposition agent.

The results were as follows:

| | % ash after 10 washes | |
|---|---|---|
| Example No. | Terry Towelling | Cotton Sheeting |
| 13A | 0.85 | 0.76 |
| 13B | 1.50 | 1.00 |
| 13C | 1.34 | 0.9 |

These results demonstrate the benefits of the antideposition agent used in Example 13A.

We claim:

1. A detergent composition for washing fabrics, comprising:

(i) from 5% to 40% by weight of a detergent active material;

(ii) from 5% to 75% by weight of a water-soluble carbonate material selected from alkali metal carbonates, bicarbonates and mixtures thereof; and (iii) from 0.1% to 10% by weight of an antideposition agent which comprises a calcium containing compounds which in a free calcium ion influence test (as herein defined) yields a value of A below 0.5° FH and a value of B above 0.5° FH. and has the general formula $$Ca_xM_mP_2O_7.nH_2O$$

wherein M is selected from potassium, sodium, hydrogen and ammonium ions, and any mixture thereof, x is from 12.5 to 1.75 m is from 0.5 to 1.52×plus m is approximately equal to 4 and n is greater than zero.

2. A calcium containing compound, suitable for use as an antideposition agent in the washing of fabrics, the compound being characterised by having the general formula $$Ca_xM_mP_2O_7.nH_2O$$

wherein M is selected from, sodium, hydrogen and ions, or any mixture thereof, x is from 1.25 to 1.75, m is from 0.5 to 1.5, 2x plus m is approximately equal to 4 and n is greater than zero.

3. A method of preparing a calcium containing compound as claimed in claim 2, comprising the steps of (i) mixing a calcium chloride solution having a concentration of more than 0.5 molar at a pH of less than 3.6 with a sodium dihydrogen pyrophospate solution having a concentration of between 0.25 and 0.33 molar, (ii) allowing the mixture to stand to form a precipitate and (iii) filtering off the precipitate formed in step (ii).

* * * * *